No. 757,185. PATENTED APR. 12, 1904.
G. ERLWEIN.
MANUFACTURE OF CYANAMID SALTS.
APPLICATION FILED AUG. 16, 1902.
NO MODEL.
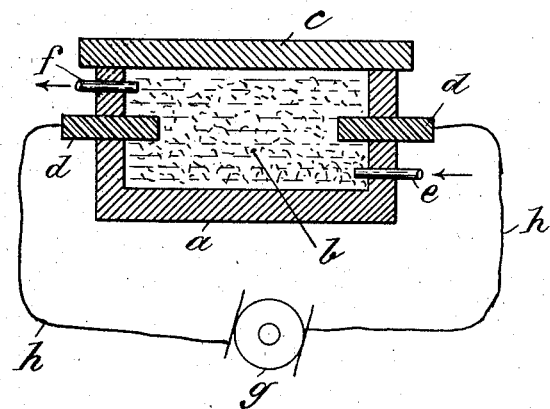

No. 757,185.                                                       Patented April 12, 1904.

UNITED STATES PATENT OFFICE.

GEORG ERLWEIN, OF BERLIN, GERMANY, ASSIGNOR TO THE FIRM OF CYANID.-GESELLSCHAFT MIT BESCHRÄNKTER HAFTUNG, OF BERLIN, GERMANY.

MANUFACTURE OF CYANAMID SALTS.

SPECIFICATION forming part of Letters Patent No. 757,185, dated April 12, 1904.

Application filed August 16, 1902. Serial No. 119,933. (No specimens.)

*To all whom it may concern:*

Be it known that I, GEORG ERLWEIN, a subject of the King of Bavaria and the German Emperor, residing at 88 Markgrafenstrasse, Berlin, Kingdom of Prussia, German Empire, have invented new and useful Improvements Relating to the Manufacture of Cyanamid Salts, of which the following is a specification.

This invention relates to the manufacture of cyanamid salts by means of carbon, lime, and nitrogen, and has for its object to render the manufacture more expeditious and considerably cheaper.

In the accompanying drawing an apparatus by means of which the improved process may be carried out is represented in vertical section.

In some publications—for instance, in the British specification 15,066 of 1895—there is described a process of treatment of carbids or carbid-forming mixtures in a finely-divided state with nitrogen at temperatures up to 1,100° centigrade. Now while that process is certainly capable of being successfully carried out when the carbids are formed beforehand or when mixtures that will form barium carbid are employed it is not possible to obtain cyanamid salts in accordance with the directions given in said prior specification when mixtures forming calcium carbid are used. It would appear, then, that the absorption of nitrogen by calcium-carbid-forming mixtures is a reaction distinct from the behavior of other carbid-forming mixtures. Evidence of this, moreover, is afforded by the fact that pure calcium cyanamid may be obtained by the method herein described from calcium-carbid-forming mixtures according to the equation $CaO + 2C + 2N = CaCN_2 + CO$, whereas if barium-carbid-forming mixtures be used the cyanamid salt obtained will always have its purity impaired by cyanid.

Now the subject of this invention is a process whereby calcium cyanamid may be obtained from mixtures containing either calcium oxid and charcoal or calcium carbonate and charcoal, as the case may be. The process results from its having been observed that nitrogen is absorbed by mixtures of lime and charcoal at a considerably higher temperature than that which is necessary for that absorption to take place where ready-made calcium carbid is employed, while it is desirable, on the other hand, that the high temperature requisite for the formation of calcium carbid from carbid-forming mixtures should, as far as possible, be avoided.

In performing this process a mixture of lime and carbon in such proportions as are required for the formation of cyanamid—for example, 56CaO and 24C—is, in a powdered or properly-disintegrated state, placed in a furnace capable of producing high temperatures, an electric furnace of ordinary construction being adopted in preference. This special arrangement of the furnace will of course vary according to the special circumstances under which operations are to be carried on. The mode of electric heating to be selected or the question as to whether continuous or alternating current is to be used will also be determined according to the conditions under which the process has to be performed. It will be understood that instead of the electric furnace any other source of heat enabling high temperatures to be reached without undue sacrifice of efficiency may be utilized. The mixture of lime and charcoal is placed in a receiver or chamber permitting the nitrogen to be conducted either over or through the mixture.

In the accompanying drawing a vertical section of an apparatus suitable for carrying out my process is represented. The receptacle *a* of suitable form and suitable material sufficiently fireproof in order to resist the attack of the heat evolved in the process—for instance, lime—is intended to receive the mixture of coal and lime, (indicated at *b*.) The receptacle *a* may be covered with a lid *c* of suitable material—for instance, lime. *d d* are electrodes of suitable form and material—for instance, carbon—which electrodes are joined by means of the wires *h h* with a suitable machine *g* for producing electricity. The nitrogen or the gas containing nitrogen enters into the apparatus at *e*. The waste gases, consisting chiefly of nitrogen and carbon monoxid, are led from the apparatus by means of the channel $f$.

My process may be carried out by means of the apparatus described in the following manner: The mixture of coal and lime is put into the receptacle $a$, then the receptacle is covered with the lid $c$, and the mixture $b$ is heated by the electrodes $d\ d$ by means of the electric current generated at $g$, whereas nitrogen is introduced into the apparatus at $e$ and the waste gases are led away at $f$. In this chamber or receiver the said mixture of lime and charcoal is heated to about 2,000° centigrade, (the temperature for previously-formed calcium carbid necessary to combine with nitrogen lying somewhat between 800° and 1,000° centigrade,) and the nitrogen is then sent over or through such mixture. The rate of speed at which the nitrogen is introduced should be regulated by the operator, according to the course the process takes, a good plan being so to fix the rate that the nitrogen introduced may as completely as possible be absorbed by the heated mixture of lime and charcoal and that only a comparatively small amount of nitrogen may pass through the apparatus unabsorbed. The operator will be able to determine this either by ascertaining the proportion of nitrogen contained in the samples taken from the heated mixture or by ascertaining the proportion of nitrogen contained in the gas escaping from the furnace. The operation is to be regarded as complete when it is found on continuing to admit nitrogen that the heated mixture of charcoal and lime no longer binds the nitrogen to any appreciable extent.

Instead of charcoal and lime a mixture of charcoal with calcium carbonate or any other calcium or lime compound capable of yielding calcium cyanamid may be employed or any metal—e. g., iron—might be added to the mixture of lime and charcoal for the purpose of enhancing its conductivity.

It has furthermore been discovered that not only cyanamid-forming mixtures containing calcium oxid and carbon in the proportions necessary for the production of calcium cyanamid, (namely, 56CaO and 24C,) but that a further addition of charcoal or, if necessary, organic substances containing carbon—such as sawdust, pitch, tar, or the like—may be used with advantage to supplement the cyanamid-forming mixtures, a mixture of fifty parts of charcoal and fifty parts of lime being employed, for example. The result hereby attained is to render that great care unnecessary which is required where cyanamid-forming mixtures are to be used in a theoretically correct proportion—viz., mixtures containing the exact amount of carbon necessary for the formation of cyanamid. In other respects the mode of performance of the process is the same as above described.

The production of the nitrogen and the operation of conducting it over or through the mixture is performed in the well-known manner. Instead of nitrogen air or other nitrogen-containing gases may be employed.

What I claim as my invention, and desire to secure by Letters Patent, is—

1. The process of producing a cyanamid salt of calcium which consists in heating a mixture containing lime and carbon in the presence of a nitrogen-bearing gas.

2. The process of producing cyanamid salts of calcium which consists in heating a mixture containing lime and carbon in the presence of a nitrogen-bearing gas to a temperature higher than that required for combining nitrogen with a carbid.

3. The process of producing a cyanamid salt of calcium which consists in heating a mixture containing lime and carbon in the presence of a nitrogen-bearing gas to a temperature lower than is required to form a carbid.

4. The process of producing a cyanamid salt of calcium which consists in heating a mixture containing lime and carbon in the presence of a nitrogen-bearing gas to a temperature higher than that required for combining nitrogen with carbid but lower than is required to produce a carbid.

5. The process of producing cyanamid salts of calcium which consists in heating a mixture containing lime and carbon to a temperature of 2,000° centigrade in the presence of a nitrogen-bearing gas.

6. The process of producing cyanamid salts of calcium which consists in heating a mixture containing lime and an excess of carbonaceous material to a temperature of 2,000° in the presence of a nitrogen-bearing gas.

7. The process of producing cyanamid salts of calcium which consists in heating by means of an electric current a mixture containing lime, carbon and a conducting material in the presence of a nitrogen-bearing gas.

In witness whereof I have hereunto signed my name, this 2d day of August, 1902, in the presence of two subscribing witnesses.

GEORG ERLWEIN.

Witnesses:
 HENRY HASPER,
 WOLDEMAR HAUPT.